(12) United States Patent
Narayanaswamy

(10) Patent No.: US 6,418,888 B1
(45) Date of Patent: Jul. 16, 2002

(54) ULTRA SONIC OR HEAT STAKED FASTENING FOR AIR INTAKE MANIFOLD ACTIVE SYSTEM

(75) Inventor: Karthikeyan R. Narayanaswamy, Canton, MI (US)

(73) Assignee: Siemens VDO Automotive, Inc., Tilbury (CA)

(*) Notice: Subject to any disclaimer, the term of this patent is extended or adjusted under 35 U.S.C. 154(b) by 0 days.

(21) Appl. No.: 09/829,333

(22) Filed: Apr. 9, 2001

Related U.S. Application Data
(60) Provisional application No. 60/242,872, filed on Oct. 24, 2000.

(51) Int. Cl.[7] ............................................. F02B 29/00
(52) U.S. Cl. ................................................. 123/41.61
(58) Field of Search ....................... 123/184.21, 184.61, 123/184.42, 184.55, 184.24, 184.34, 184.47; 264/250, 513

(56) References Cited

U.S. PATENT DOCUMENTS

| | | | | |
|---|---|---|---|---|
| 5,435,279 A | * | 7/1995 | Brummer et al. | 123/184.21 |
| 5,947,073 A | * | 9/1999 | Chaffin et al. | 123/184.61 |
| 6,024,188 A | * | 2/2000 | Yamaguchi et al. | 123/184.21 |
| 6,209,501 B1 | * | 4/2001 | Kaneko | 123/184.21 |
| 6,267,093 B1 | * | 7/2001 | Lohr | 123/184.61 |

* cited by examiner

Primary Examiner—Marguerite McMahon
Assistant Examiner—Hyder Ali

(57) ABSTRACT

A plurality of bosses on a lower manifold assembly are press fit into a plurality of holes in an active system body to form an air intake manifold assembly. Ultrasonic energy or heat is applied to the upper surface of the active system body proximate to each of the holes, slightly melting the outer surface of the bosses and the inner surface of the holes, creating a bond which secures the active system body to the lower manifold assembly. A compression seal can also be utilized to provide additional sealing.

16 Claims, 2 Drawing Sheets

ULTRA SONIC OR HEAT STAKED FASTENING FOR AIR INTAKE MANIFOLD ACTIVE SYSTEM

This application claims priority from provisional application Ser. No. 60/242,872 filed Oct. 24, 2000.

BACKGROUND OF THE INVENTION

The present invention relates generally to an ultra sonic or heat staked fastening system utilized on an air intake manifold system.

Self-tapping screws are commonly utilized to assemble and fasten an active system body to a manifold lower assembly of an air intake manifold system. An air intake manifold system brings air into an internal combustion engine at the required temperature and velocity. The screws are designed for fastening the components together under prolonged engine vibration conditions and are exposed to high temperature engine fluids such as gasoline, oil and lubricants. Due to possible operator error or installation equipment malfunction, the screws could loosen and disengage over time due to engine vibrations, possibly resulting in engine failure.

A bonding/adhesive agent is commonly used to retain the screws in the air intake manifold system. However, the bonding agent can weaken due to high temperatures and exposure to gasoline and oil. This can affect the performance of the bonding agent. Additionally, the application of the bonding agent to the screw is unpredictable and may accidentally contact other components proximate to the screws. Finally, it is difficult to determine the strength of the bonding agent both during and after manufacturing.

Hence, there is a need in the art for an improved attachment system utilized to attach an active system body to a lower manifold assembly of an air intake manifold system.

SUMMARY OF THE INVENTION

The present invention relates generally to an ultra sonic or heat staked fastening system for use on an air intake manifold system.

An air intake manifold system includes an active system body secured to a lower manifold assembly. The lower manifold assembly includes a plurality of molded plastic bosses, and the plastic active system body includes a plurality of aligned holes. The diameter of the plastic bosses is slightly greater than the diameter of the holes. It is preferred that eight bosses and eight holes are employed. When the air intake manifold system is assembled, the bosses on the lower manifold assembly are press fit into the holes in the active system body.

An ultra sonic or heat staking process is employed to secure the press fit bosses into the holes. Ultrasonic energy or heat is applied to the upper surface of the active system body proximate to each of the holes, slightly melting the outer surface of the bosses and the inner surface of the holes. The melting of these two surface creates a bond which secures the active system body to the lower manifold assembly.

Accordingly, the present invention provides an ultra sonic or heat staked fastening system utilized on an air intake manifold system.

These and other features of the present invention will be best understood from the following specification and drawings.

BRIEF DESCRIPTION OF THE DRAWINGS

The various features and advantages of the invention will become apparent to those skilled in the art from the following detailed description of the currently preferred embodiment. The drawings that accompany the detailed description can be briefly described as follows.

DETAILED DESCRIPTION OF THE PREFERRED EMBODIMENT

Figure 1:
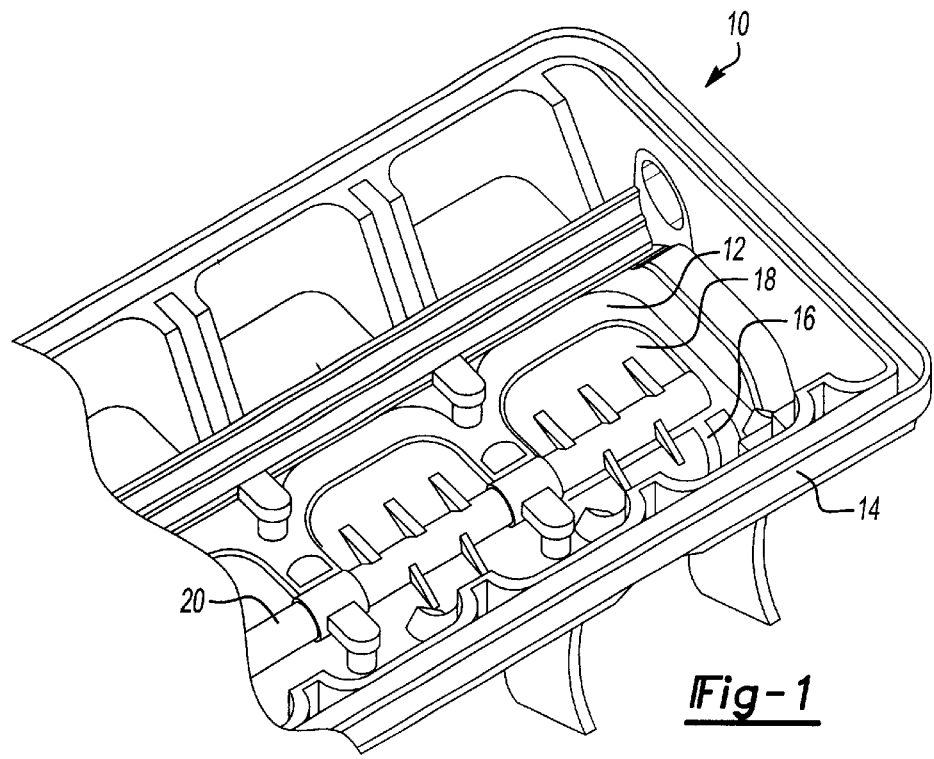
FIG. 1 illustrates a top view of an air intake manifold system.

FIG. 1 illustrates an air intake manifold system 10. The air intake manifold system 10 includes an active system body 12 attached and secured to a manifold lower assembly 14. The active system body 12 includes a plurality of active system ports 16. A plurality of active system butterfly valves 18 connected to a rotating shaft 20 control the flow of air into the air intake system 10 of an internal combustion engine. The plurality of valves 18 are received within the plurality of active system ports 16, and the rotating shaft 20 rotates the valves 18 to control the degree of opening. In the preferred embodiment, there are four active system valves 18 and four active system ports 16.

The plurality of valves 18 control the flow of air into the internal combustion engine. When more air is to enter the engine, the rotating shaft 20 rotates the plurality of valves 18 away from the active system ports 16 of the active system body 12, allowing more air to enter the internal combustion engine. Conversely, when less air is to be allowed to enter the engine, the rotating shaft 20 rotates to move the plurality of valves 18 towards the active system ports 16 of the active system body 12, allowing less air to enter the internal combustion engine.

Figure 2:
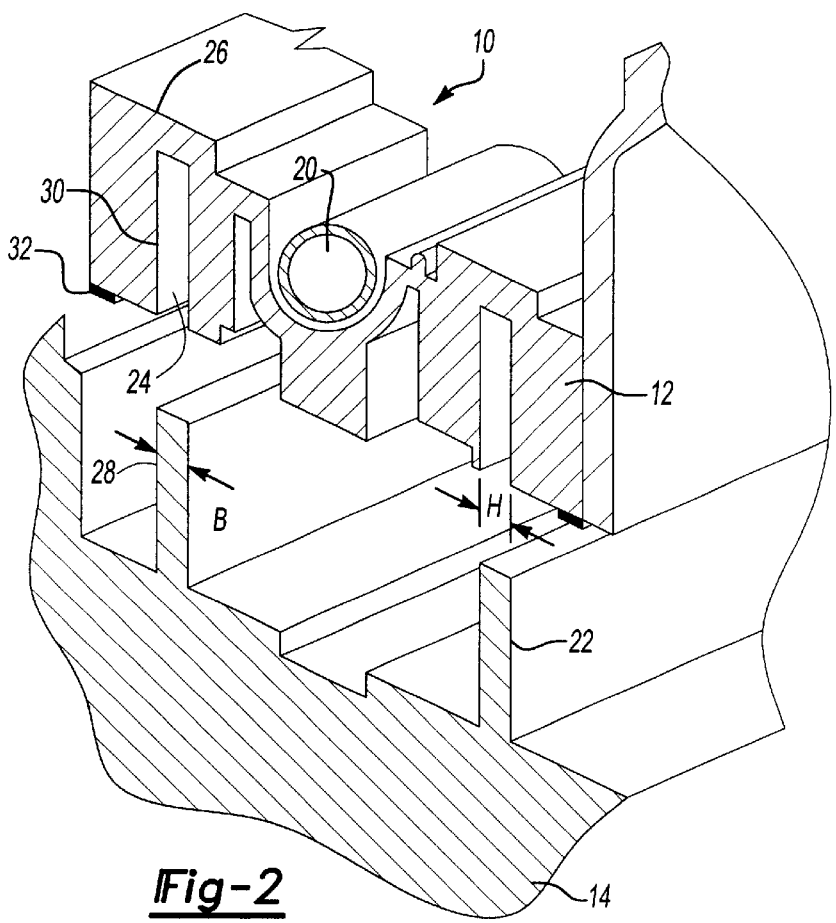
FIG. 2 illustrates a cross sectional view of an active system body and a lower manifold assembly prior to assembly.

As illustrated in FIG. 2, the lower manifold assembly 14 includes a plurality of molded plastic bosses 22 having a diameter B. A plurality of holes 24 having a diameter H are formed in the plastic active system body 12 and are positioned to align with the plurality of bosses 22. The diameter B of the bosses 22 is slightly greater than the diameter H of the holes 24. In the preferred embodiment, eight bosses 22 and eight aligned holes 24 are employed to fasten the active system body 12 to the lower manifold assembly 14. In an alternative embodiment, the bosses 22 are formed on the active system body 12 and the holes 24 are formed in the lower manifold assembly 14.

Figure 3:
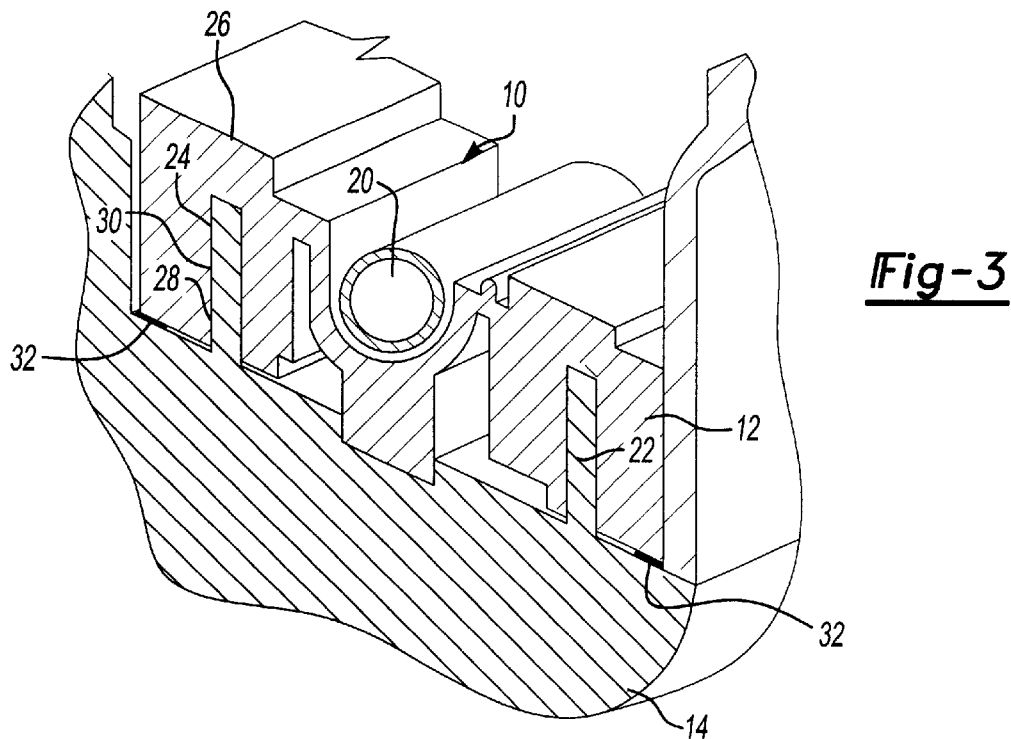
FIG. 3 illustrates a cross sectional side view of an air intake manifold utilizing the fastening system of the present invention.
Figure 4:
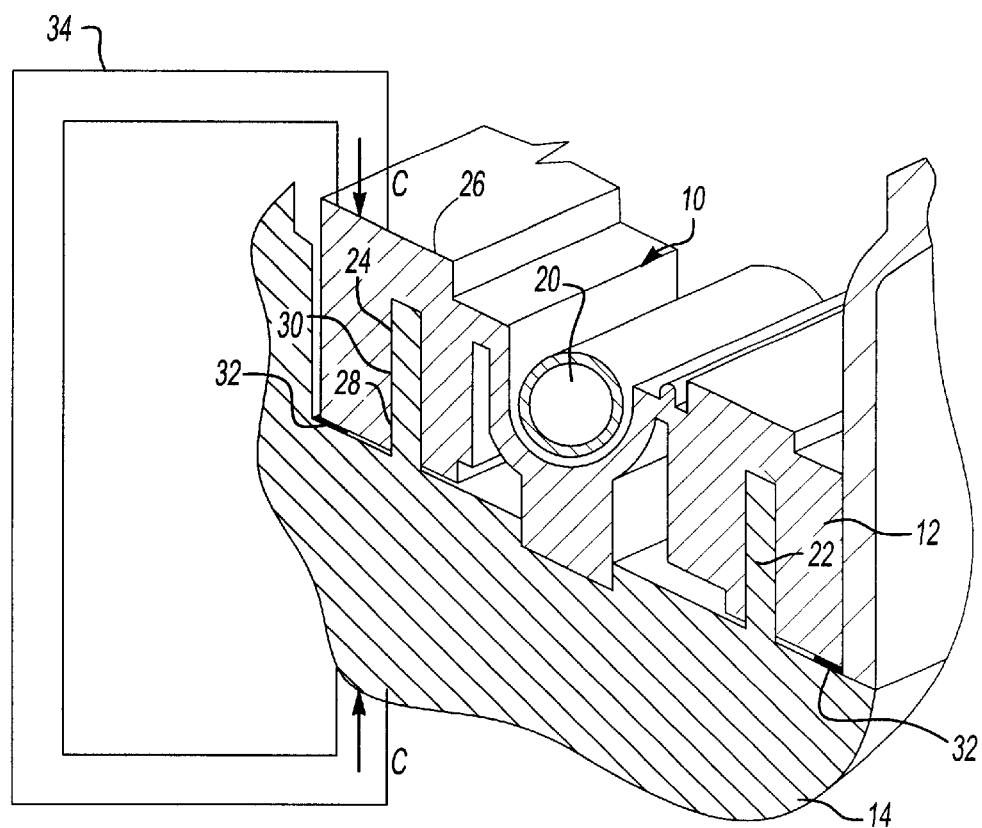
FIG. 4 illustrates a cross sectional side view of an active system body clamped to a manifold lower assembly to provide additional security at the seal.

The active system body 12 is positioned over the lower manifold assembly 14 such that the plurality of holes 24 are substantially aligned over the plurality of bosses 22. The larger diameter B bosses 22 of lower manifold assembly 14 are then press fit into the aligned smaller diameter H holes 24 of active system body 12, as illustrated in FIG. 3.

An ultra sonic or heat staking process is utilized to secure active system body 12 to the lower manifold assembly 14. In an ultra sonic or heat staking process, ultra sonic energy or heat is applied to substantially similar materials which are brought into contact to slightly melt the materials and create a bond. Ultrasonic energy or heat is applied to the upper surface 26 of the active system body 12 proximate to each of the holes 24, slightly melting the outer surface 28 of the bosses 22 and the inner surface 30 of the holes 24, creating a bond which secures the active system body 12 to the lower manifold assembly 14.

An optional feature of the present invention is a compression seal 32 located around the perimeter of the active system body 12. The seal 32 assists in securing the active system body 12 to the lower manifold assembly 14. A clamping device or tool 34 is utilized to provide compression C to the seal 32. The ultra sonic energy or heat is then applied to melt the bosses 22 and the holes 24, forming a bond. The ultra sonic or heat also slightly melts the seal 32 to form another bond around the perimeter of the active system body 12. The clamping device is then removed from the air intake manifold system 10, and the seal 32 further secures the active system body 12 to the lower manifold assembly 14.

There are several advantages to utilizing an ultra sonic or heat staked fastening system on an air intake manifold system 10. For one, screws are not utilized. Screws are expensive and can cause engine failure if they disengage from the system. Additionally, an ultra sonic or heat staked fastening process creates high resistance to vibrations.

The foregoing description is only exemplary of the principles of the invention. Many modifications and variations of the present invention are possible in light of the above teachings. The preferred embodiments of this invention have been disclosed, however, so that one of ordinary skill in the art would recognize that certain modifications would come within the scope of this invention. It is, therefore, to be understood that within the scope of the appended claims, the invention may be practiced otherwise than as specially described. For that reason the following claims should be studied to determine the true scope and content of this invention.

What is claimed is:

1. An air intake manifold assembly comprising:
   a manifold lower assembly component;
   an active system body component;
   a plurality of recesses located on one of said components;
   a plurality of protrusions located on the other of said components, each of said plurality of protrusions substantially sized, shaped and positioned to be inserted into one of said plurality of recesses; and
   a bond securing each of said plurality of protrusions to one of said plurality of recesses formed by a melting of at least one of either of said plurality of protrusions and said plurality of recesses.

2. The air intake manifold assembly as recited in claim 1 wherein said plurality of recesses are located on said active system body component and said plurality of protrusions are located on said manifold lower assembly component.

3. The air intake manifold assembly as recited in claim 1 wherein each of said plurality of protrusions is substantially press fit into one of said plurality of recesses.

4. The air intake manifold assembly as recited in claim 1 wherein said bond is formed by ultrasonic energy.

5. The air intake manifold assembly as recited in claim 4 wherein ultrasonic energy forms said bond by substantially slightly melting an outer surface of each of said plurality of protrusions and an outer surface of one of said plurality of holes.

6. The air intake manifold assembly as recited in claim 1 wherein said bond is formed by heat staking.

7. The air intake manifold assembly as recited in claim 6 wherein heat forms said bond by substantially slightly melting an outer surface of each of said plurality of protrusions and an outer surface of one of said plurality of holes.

8. The air intake manifold assembly as recited in claim 1 wherein said plurality of protrusions and said plurality of recesses are formed of substantially the same material.

9. The air intake manifold assembly as recited in claim 1 wherein there are eight of said plurality of protrusions and eight of said plurality of recesses.

10. An air intake manifold assembly comprising:
    a manifold lower assembly component;
    an active system body component positioned on said manifold lower assembly and including a plurality of ports;
    a rotatable shaft including a plurality of valves, each of said plurality of valves being received within one of said plurality of ports in a closed position, said shaft rotating to substantially disengage each of said plurality of valves from one of said plurality of ports in an open condition;
    a plurality of recesses located on one of said components, each of said plurality of recesses having a recess diameter;
    a plurality of protrusions located on the other of said components, each of said plurality of protrusions having a protrusion diameter which is slightly greater than said recess diameter, and each of said plurality of protrusions being substantially sized, shaped and positioned to be press fit into one of said plurality of recesses; and
    a bond securing each of said plurality of protrusions to one of said plurality of recesses formed by a melting of at least one of either of said plurality of protrusions and said plurality of recesses.

11. A method for forming an air intake manifold assembly comprising the steps of:
    press fitting a plurality of protrusions located on a manifold lower assembly component into a plurality of aligned recesses located on an active system body component; and
    melting slightly at least one of either of said plurality of protrusions and said plurality of recesses to secure each of said plurality of protrusions to one of said plurality of recesses.

12. The method as recited in claim 11 wherein the step of melting at least one of either of said plurality of protrusions and said plurality of recesses is caused by ultrasonic energy.

13. The method as recited in claim 11 wherein the step of melting at least one of either of said plurality of protrusions and said plurality of recesses is caused by heat staking.

14. An air intake manifold assembly comprising:
    a manifold lower assembly component;
    an active system body component;
    a plurality of recesses located on one of said components each having a recess diameter;
    a plurality of protrusions located on the other of said components each having a protrusion diameter, each of said plurality of protrusions substantially sized, shaped and positioned to be inserted into one of said plurality of recesses, and said protrusion diameter being substantially slightly greater than said recess diameter; and
    a bond securing each of said plurality of protrusions to one of said plurality of recesses formed by a melting of at least one of either of said plurality to protrusions and said plurality of recesses.

15. An air intake manifold assembly comprising:
    manifold lower assembly component;
    an active system body component;

a plurality of recesses located on one of said components;

a plurality of protrusions located on the other of said components, each of said plurality of protrusions substantially sized, shaped and positioned to be inserted into one of said plurality of recesses;

a bond securing each of said plurality of protrusions to one of said plurality of recesses formed by a melting of at least one of either of said plurality of protrusions and said plurality of recesses; and a seal positioned substantially around an outer periphery of said active system body component to further secure said active system body component to said lower manifold assembly component.

16. The air intake manifold assembly as recited in claim 15 wherein a clamping device provides compression to said seal.

* * * * *